United States Patent [19]

McClure et al.

[11] Patent Number: 5,465,790

[45] Date of Patent: Nov. 14, 1995

[54] ENHANCED OIL RECOVERY FROM HETEROGENEOUS RESERVOIRS

[75] Inventors: Donald C. McClure, Parker; Hiemi K. Haines, Englewood, both of Colo.

[73] Assignee: Marathon Oil Company, Findlay, Ohio

[21] Appl. No.: 226,189

[22] Filed: Apr. 11, 1994

[51] Int. Cl.$^6$ .................................................. E21B 43/22
[52] U.S. Cl. .................................................. 166/273
[58] Field of Search .................................. 166/268, 273, 166/274

[56] References Cited

U.S. PATENT DOCUMENTS

| | | | |
|---|---|---|---|
| 3,386,506 | 6/1968 | Quance | 166/273 |
| 3,529,668 | 9/1970 | Bernard | 166/273 |
| 3,653,440 | 4/1972 | Reisberg | 166/273 |
| 3,882,940 | 5/1975 | Carlin | 166/273 |
| 4,004,637 | 1/1977 | Needham et al. | 166/273 |
| 4,113,011 | 9/1978 | Bernard et al. | 166/273 |
| 4,287,950 | 9/1981 | Baker et al. | 166/273 X |
| 4,380,266 | 4/1983 | Wellington | 166/252 |
| 4,739,831 | 4/1988 | Settlemeyer et al. | 166/273 |
| 4,842,065 | 6/1989 | McClure | 166/252 |
| 4,846,276 | 7/1989 | Haines | 166/273 |
| 4,856,589 | 8/1989 | Kuhlman et al. | 166/273 |
| 4,860,828 | 8/1989 | Oswald et al. | 166/274 |
| 5,042,580 | 8/1991 | Cullick et al. | 166/273 X |

OTHER PUBLICATIONS

J. B. Lawson and J. Reisberg, "Alternate Slugs of Gas and Dilute Surfactant for Mobility Control During Chemical Flooding," SPE 8839, presented at First Joint SPE/DOE Symposium on Enhanced Oil Recovery, Tulsa, Okla., Apr. 20–23, 1980.

G. G. Bernard, et al., "Use of Surfactant to Reduce CO2 Mobility in Oil Displacement," Society of Petroleum Engineers Journal, Aug. 1980, pp. 281–292.

*Primary Examiner*—George A. Suchfield
*Attorney, Agent, or Firm*—Jack L. Hummel; Jack E. Ebel

[57] ABSTRACT

A process for recovering oil from a multiple-layered heterogeneous reservoir with a higher oil saturation in the lower permeability layers than in the higher permeability layers. An aqueous surfactant solution is injected into the formation, where it imbibes into the lower permeability layers and displaces a first quantity of oil into the higher permeability layers. Next, a first aqueous fluid is injected to sweep the displaced oil from the higher permeability layers into at least one production well. A gas is injected into the formation to displace a second quantity of oil from the lower permeability layers. The second aqueous fluid is injected to sweep the displaced oil into at least one production well. The process may be repeated one or more times.

14 Claims, 1 Drawing Sheet

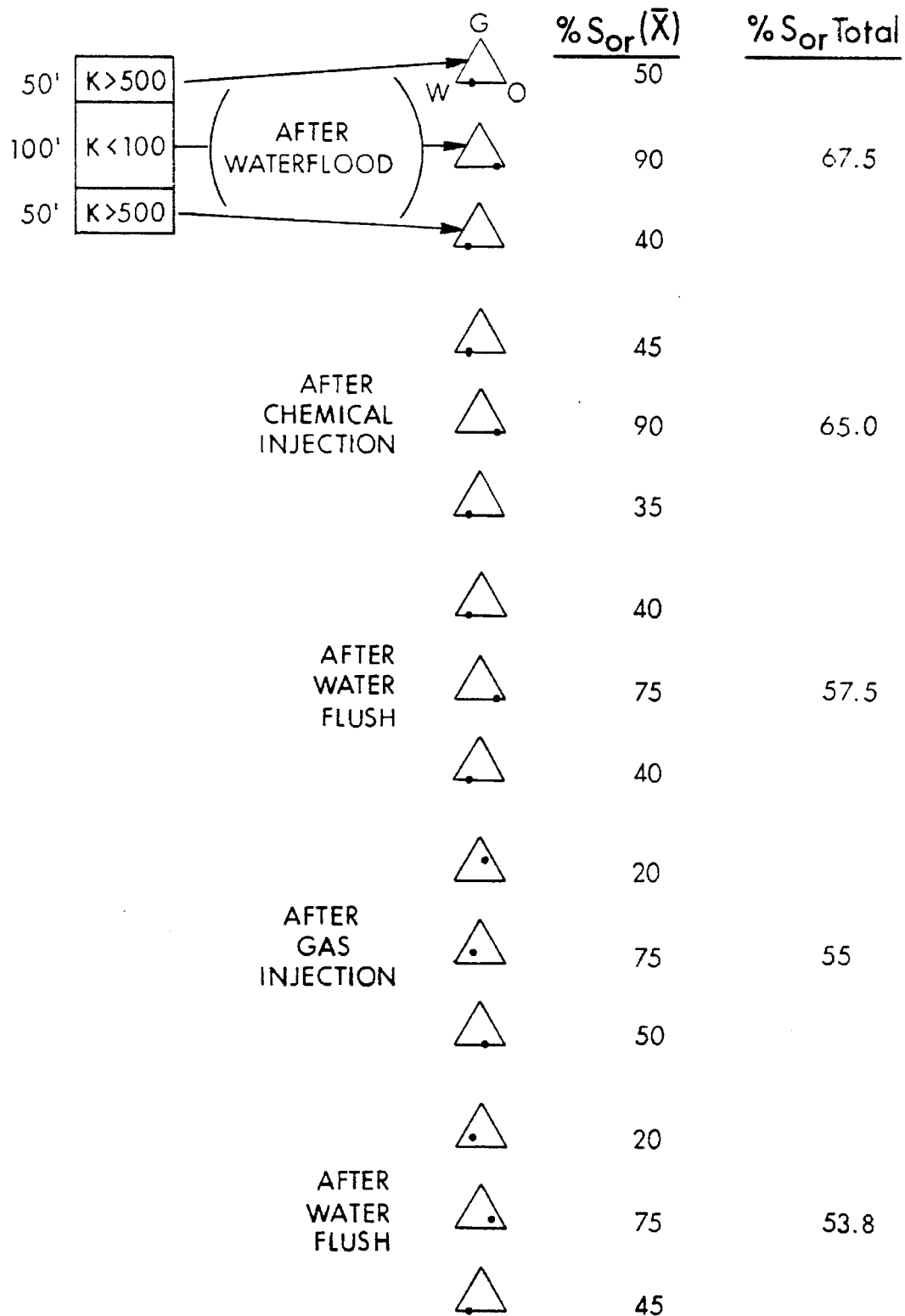

ENHANCED OIL RECOVERY FROM HETEROGENEOUS RESERVOIRS

BACKGROUND OF THE INVENTION

1. Field of the Invention

The present invention relates to a process for enhanced recovery of hydrocarbons, and more particularly to a process for enhanced recovery of oil from heterogeneous reservoirs.

2. Description of Related Art

Use of conventional enhanced oil recovery processes, such as water flooding and gas flooding, in reservoirs with heterogeneous permeability results in flooding fluids channeling through higher permeability layers and bypassing lower permeability layers. Thus, significant quantities of oil remain in the lower permeability layers.

One approach to increasing the oil recovery from the lower permeability layers is a foam matrix conformance treatment, in which a foam is placed in the higher permeability layers of the heterogeneous formation to divert the flooding fluid through the lower permeability layers. Such areal conformance treatments are limited in their applicability to regions within about 30 to 40 feet of the injection wellbore. Thus, foam conformance treatments are generally not appropriate for applications where the injection and production wells are far apart, as, for example, in most offshore operations. Further, oil in the reservoir emulsifies the surfactant in the foam and breaks the foam down.

Cyclic wettability alteration, described in U.S. Pat. No. 4,842,065 to D. C. McClure, is an approach to increasing the recovery of oil from oil-wet fractured formations; the reservoir is flooded cyclically with a surfactant solution and water. The surfactant solution enters the fracture network of the formation and subsequently imbibes into a portion of the matrix blocks adjacent to the fracture network. The solution renders the portion of the matrix blocks it contacts surfactant-wet and simultaneously displaces oil from the surfactant-wet portion of the matrix blocks into the fracture network. Following injection of the surfactant solution, the formation is water flooded. The water flood desorbs the water soluble fraction of the surfactant mixture from the surfactant-wet portion of the matrix blocks, restoring this portion of the matrix blocks to an oil-wet condition. The water flood also sweeps oil from the fracture network to the surface, where the oil is recovered via a production well. The cycle can be repeated as often as desired.

Another approach to increasing oil recovery from lower permeability layers is water-alternating-gas (WAG)injections. U.S. Pat. No. 4,846,276 to H. K. Haines describes a WAG process in which gas is injected into an oil-bearing formation. The gas injection pressure is less than the formation fracturing pressure and the minimum miscibility pressure of the injection gas in the oil in place, but greater than the bubble point pressure of the oil. When oil production has declined to a predetermined level, gas injection is terminated. Water injection is then initiated from an injection well while maintaining the production well in operation; oil is continuously produced from the production well simultaneously with water injection until oil production diminishes to a predetermined level. The injection cycle may then be repeated.

One speculated mechanism for the WAG process relies on the ability of the injected gas to reduce the viscosity and density of the oil in place by swelling the oil despite the relative immiscibility of the gas in the oil. The injected water subsequently sweeps more oil to the production well because the oil is less viscous and less dense.

Another possible mechanism for the WAG process is gas trapping. Injected gas displaces water occupying pore spaces in the formation, and the gas subsequently occupies the space. When the formation is then flooded with water, the gas in place diverts the water to oil-bearing portions of the formation which have not been previously flooded. Thus, the gas flood effectively reduces the volume of the formation which the water flood must sweep to recover a given quantity of oil and promotes sweeping of pore spaces which would not otherwise be contacted by the water.

A third possible mechanism for oil mobilization during the WAG process is gravity segregation. The gas is significantly less dense than oil and water. As the gas moves upward through the formation rock, it displaces oil downward.

U.S. Pat. No. 4,113,011 to G. G. Bernard describes another process for enhanced oil recovery using fluid displacement by dense carbon dioxide in situations where foam formation is unsatisfactory. For example, many foaming agents are unstable in acidic and highly saline media. In the process, a slug of an aqueous surfactant solution is injected into the formation. The preferred surfactant solution contains aqueous alkyl polyethylene oxide sulfate. The surfactant solution is then displaced by a subsequently injected quantity of carbon dioxide dense fluid. The carbon dioxide pressure is greater that 1500 psi, above the miscible-displacement pressure but below the formation fracture pressure. An optional drive fluid, such as water or brine, can be injected to drive the carbon dioxide through the reservoir.

The use of high pressure and dense carbon dioxide results in a smaller density difference between the oil and the flooding phase, thereby decreasing the amount by which the oil expands when contacted by the carbon dioxide. The use of dense carbon dioxide also eliminates gas trapping as a mechanism for diverting aqueous fluids into previously unflooded oil-bearing portions of the formation. Thus, the use of dense carbon dioxide reduces the beneficial effects obtained when a gas phase is used, as in the WAG process.

In addition, liquefied carbon dioxide is also less available and more expensive than other gases for injection, such as produced natural gas. Other advantages from using natural gas include safer operation, the ability to use smaller gas compressors, and a reduced risk of undesirable formation fracturing. Natural gas does not liquefy under reasonable injection pressures and reservoir temperatures.

As previously mentioned, neither the WAG process nor the cyclic wettability process results in a complete sweep of the formation. Although both of these processes reduce the tendency for water fingering during enhanced recovery in a heterogeneous formation, neither completely eliminates fingering. Thus, there is a need for a process which further increases volumetric sweep efficiency so as to increase the quantity of oil that can be recovered during enhanced recovery. Additionally, for reasons set forth above, a need exists for an enhanced recovery process that combines the benefits of the WAG and cyclic wettability alteration processes, using a broad range of gas compositions at a broad range of injection pressures.

Accordingly, it is an object to the present invention to provide a method which improves volumetric sweep efficiency and increases oil recovery. It is a further object of the present invention to combine the effects of the WAG and cyclic wettability processes.

SUMMARY OF THE INVENTION

To achieve the foregoing and other objects, and in accordance with the purposes of the present invention, as embodied and broadly described herein, one characterization of the present invention comprises a process for enhanced recovery of hydrocarbons from a subterranean formation penetrated by at least one injection well and at least one production well in fluid communication with the formation. The formation has vertically heterogeneous permeability, with multiple approximately horizontal layers. Layers having a higher permeability and containing higher aqueous fluid saturations and some mobile oil are separated by lower permeability layers having a higher oil saturation. In the process of the present invention, an aqueous surfactant solution is injected into the formation via the at least one injection well. The amount of surfactant dissolved in the solution is an amount effective to lower the oil/water interface tension in the higher permeability layers and of the outer portions of the lower permeability layers. The interface tension change allows the aqueous solution to imbibe into the lower permeability layers and replace a first quantity of oil in the lower permeability layers. The buoyancy of the replaced oil results in gravity segregation and oil migration up dip in the higher permeability layers. A first aqueous fluid is injected into the formation via the at least one injection well to sweep the first quantity of oil from the higher permeability layers. A gas is injected into the formation via the at least one injection well, a portion of the gas entering the lower permeability layers by gravity segregation, thereby replacing a second quantity of oil from the lower permeability layers down dip into the higher permeability layers. A second aqueous fluid is injected into the formation via the at least one injection well to sweep said second quantity of oil from the higher permeability layers. Oil is recovered from the at least one production well. The process can be repeated one or more times, and gas injection can precede surfactant solution injection.

BRIEF DESCRIPTION OF THE DRAWING

These and other features, aspects and advantages of the present invention will become better understood with reference to the following description, appended claims, and accompanying drawing, which is a schematic diagram showing the changes in fluid and gas saturations of a three-layered reservoir at successive stages of the process of the present invention.

DESCRIPTION OF THE PREFERRED EMBODIMENTS

The process of this invention is used for enhanced recovery of oil from a multiple-layered heterogeneous subterranean reservoir penetrated by at least one injection well and at least one production well in fluid communication with the reservoir. The higher permeability layers of the reservoir contain a relatively high water saturation and a relatively low oil saturation, due to efficient sweep by water flooding. The lower permeability layers of the reservoir have a somewhat higher oil saturation and a lower water saturation than the higher permeability layers. In accordance with this invention, an aqueous surfactant solution, water, and gas are injected sequentially into the reservoir to facilitate movement of oil from the lower permeability layers into the higher permeability layers. Subsequent water flooding sweeps oil from the higher permeability layers into one or more production wells. Optionally, the cycle can be repeated one or more times.

In this discussion, the term "layer" refers to an approximately horizontal part of an oil-bearing subterranean formation characterized as having relatively higher or relatively lower permeability. The permeability variations can result from any variations in the formation. For example, variations in the degree of cementation, grain size, grain size distribution, or mineralogy can cause permeability variations. The lower permeability layers may be lenticular in shape and enclosed in a higher permeability matrix. A fracture network can also introduce permeability variations, with fractures functioning as higher permeability layers and the rock matrix blocks between the fractures functioning as lower permeability layers.

The "effective pore volume" of a formation as utilized throughout this description refers to the volume of the formation which may be occupied by injected fluids over the productive life of the reservoir. The term "enhanced recovery" refers to an oil recovery process which comprises either applying an extrinsic energy source to the formation to facilitate displacement of the oil in the place without altering its properties or modifying the properties of the formation and/or the fluid interfaces in the formation to facilitate displacement of the oil from the formation.

The effect of altering the interface tension within the pores of a rock is to alter the capillary forces which cause fluids to become trapped or resist vertical mobilization within the pores. The Bond number $N_B$, a dimensionless quantity, is the ratio of gravity to capillary forces:

$$N_B = \frac{\Delta \rho g R^2}{\sigma} \quad \text{(Vertical Flow)}$$

where:
$\Delta \rho$=fluid density difference (gm/cm$^3$)
g=acceleration due to gravity (cm/sec$^2$)
R=particle radius (cm)
$\sigma$=interfacial tension (dyne/cm)

Vertical migration of a fluid through rock pore systems in the presence of a second fluid increases when the Bond number is large. Thus, vertical migration of the fluids within a layer of a rock formation can be increased by either increasing the density difference between the two fluids or decreasing the interfacial tension. For example, if one fluid is oil and the other is a gas, the density difference is relatively large, and the gas migrates upward while the oil migrates downward through the rock.

One way to alter the interfacial tension is by introducing a surfactant into the pore system. Surfactants are a class of chemical compounds possessing both hydrophilic and lipophilic characters which vary as a function of the surfactant composition and the natures of the solid surfaces and fluids contacted by the surfactant. A surfactant can coat, or "wet", surfaces with which it comes in contact. Because the surfactant is lipophilic, it decreases the surfactant/oil interface tension and allows oil to flow easily over surfactant-wet surfaces. Similarly, the surfactant's hydrophilic character lowers the surfactant/water interface tension and facilitates the flow of water over surfactant-wet surfaces.

In the process of the present invention, a surfactant solution is used to decrease the interface tension. As the surfactant imbibes into the lower permeability layers of the formation, the lower interface tension in the layer allows gravity displacement of oil upward into overlying higher permeability layers. A gas is also injected to create a large density difference between the oil and the gas, thereby displacing additional oil downward from the higher permeability layers into the underlying higher permeability layers. Oil is swept from the higher permeability layers by a drive fluid, such as water, to at least one production well. It is believed that alternating injections of surfactant and gas increase oil recovery relative to the recovery obtained with either surfactant or gas alone, because the alternating upward and downward displacement of the oil makes more paths available for the oil to flow through the pore network in the formation. In other words, an oil droplet that is blocked from moving in one direction because capillary forces have not been overcome or because trapped gas blocks a pore may be able to move in the opposite direction.

An advantage of the process of this invention is that a larger quantity of oil can be recovered when the formation is swept with water after injection of surfactant solution and gas. The surfactant flooding helps promote gas entry into a larger proportion of the pores in the lower permeability layers, and the gas flooding promotes entry of aqueous fluids into different portions of the lower permeability layers than would be entered in the absence of the surfactant flooding. The effects of the surfactant flooding and the gas flooding are complementary.

An additional advantage of the process of this invention is the prevention of the formation of a stable foam. The absence of foam promotes better gas access to pore spaces, resulting in gravity displacement of more oil from lower permeability layers to higher permeability layers. The absence of foam also promotes better surfactant adsorption in the lower permeability layers. Thus, more surfactant is imbibed into the lower permeability layers. Greater surfactant imbibition promotes replacement of a larger quantity of oil in the lower permeability layers. The result is the passage of a greater quantity of oil into the higher permeability layers.

The present process is initiated by injecting a slug containing a surfactant solution into an injection wellbore that is in fluid communication with a heterogeneous formation. The surfactant solution is capable of coating the pore surfaces within the lower permeability layers such that the oil/water interface tension is reduced in the outer portions of layers. The surfactant of this invention can be an ethoxylated alcohol, an ethoxylated sulfate, an ethoxylated phenol, or mixtures thereof. The surfactant solution is prepared by mixing the selected surfactants in an aqueous solvent, such as fresh water or brine. Brine generally has a total dissolved solids concentration above about 1000 ppm, while fresh water has a total dissolved solids concentration below about 1000 ppm.

The surfactant concentration should be sufficient to allow maximum adsorption within the reservoir. The concentration should preferably be between about 250 ppm and about 10,000 ppm, and more preferably between about 750 ppm and about 1,500 ppm, depending upon the adsorption characteristics of the formation into which the solution is injected. The injected volume of surfactant solution should be less than about one effective pore volume to promote adsorption while maintaining favorable economics.

The surfactant solution enters the permeable layers of the formation after it is injected into an injection well which is in direct fluid communication with the permeable layers. The surfactant solution is adsorbed onto the exposed grain surfaces, resulting in imbibition of surfactant solution into the lower permeability layers. It is believed that the solution penetrates at least some distance into the pores of the rock making up the outer portion of the lower permeability layers. The surfactant renders the rock which it contacts surfactant-wet. This action simultaneously displaces any oil coating the rock back out across the layer boundaries into the higher permeability layers and enhances the oil/water gravity segregation within the contacted layer.

The surfactant flooding stage of this invention is intended to provide maximum contact between the surfactant and the lower permeability layers, and the surfactant should not be foamed with the addition of gas. Thus, a quantity of water is injected after the surfactant injection to provide a spacer between the surfactant solution and the subsequently injected gas, thereby preventing foam formation. The quantity of water should be large enough to prevent significant gas fingering. However, injecting an excessively large quantity of water will delay the oil production process. The optimum quantity can be readily determined by one skilled in the art and will depend upon the characteristics of the reservoir. The preferred quantity of water ranges from a fraction of an effective pore volume to more than one effective pore volume.

The injected gas used in this process can be carbon dioxide, natural gas, nitrogen, air, or a mixture thereof. The preferred injection gas is a produced gas, such as natural gas, which has been produced from the same formation or a different formation from that which is being flooded. The bulk of the gas comprises methane. If the gas injection pressure is below the minimum miscibility pressure of the gas in the oil, the process can be operated at lower cost because less gas is required than in a miscible process to displace an equivalent amount of oil. The gas is usually injected into the formation without having undergone substantial processing or enrichment, although in some cases inorganic components of the produced gas, such as carbon dioxide or hydrogen sulfide, may be reduced or removed for operation purposes to reduce metallurgical corrosion during reinjection. Produced gas is preferred in the present process because of its availability at low cost. However, if produced gas is not readily available, alternative gases may be used, including, preferably, carbon dioxide or, less preferably, nitrogen.

The gas is injected in a manner which does not substantially raise the formation pressure to a pressure conventionally associated with pressure pulsing. Gas injection generally does not increase overall reservoir pressure more than about 5 percent. The gas volume should be large enough to replace voidage by oil and water production. The injected gas should remain in a gaseous phase after injection. By preventing the formation of a stable foam, gas contact with the entire formation is maximized, promoting gravity displacement of the oil in the lower permeability layers to the higher permeability layers. The gas also reduces the viscosity and density of the oil. In addition, the gas probably acts as a secondary agent to enhance the effects of the surfactant, pushing the surfactant farther into the lower permeability layers. Injection of gas into the oil-bearing layer proceeds until oil production at the production well declines to a predetermined level. Gas injection is then terminated and water injection is initiated from an injection well while maintaining the production well in operation.

An additional quantity of water is then injected into the formation to displace the oil from the higher permeability layers to a production well. The injection water can be any aqueous liquid with a density greater than the density of the surfactant solution. Produced brine or sea water are preferred injection waters because they are available at low cost and present a low risk of clay damage. It is also possible, although not necessary, to include additives in the injection water, such as surfactants or polymers, to further enhance the ability of the water to displace oil to the production well. The minimum quantity of water injected to sweep oil from the higher permeability layers should be about one effective pore volume of the higher permeability layers. The quantity of water injected to sweep oil from the higher permeability layers should be enough to produce all mobilized oil and water injection should continue until oil production declines to a predetermined level.

The water also imbibes into the outer shell of the matrix block and desorbs the water soluble fraction of the surfactant mixture from the surface of the surfactant-wet rock therein. The desorption of surfactant fraction restores oil as the wetting phase of the rock in the outer portion of the lower permeability layers and enables oil from the interior of the lower permeability layers to resaturate and rewet the rock in the outer portion of the lower permeability layers. This oil is then susceptible to displacement by subsequent slugs of gas and surfactant solution when the fluid injection cycle is repeated.

Simultaneous, continuous water injection at the injection well and oil production from the production well occur until oil production diminishes to a predetermined level. Water injection is then terminated.

The level of oil recovery is the primary variable which determines the duration and volume of each fluid injection stage. Generally, oil recovery increases when each fluid injection stage begins. As the injection stage continues, the level of oil recovery peaks and then declines. At some predetermined point on the decline curve, the injection stage for the next fluid begins. The termination point of the stage is often a function of the particular formation characteristics and the type of injection and production fluids. In most cases, it can be predetermined by experimental or theoretical modeling.

Although the process is described above in terms of continuous oil production and continuous fluid injection of either surfactant, gas, or water, the present process can also be practiced without deviating from the scope of the invention by interrupting and resuming either fluid injection, oil production, or both at any given time. However, if such interruptions occur, they are performed for purposes other than pressure pulsing the oil-bearing layer. In general, the present process is operated at either a substantially constant pressure or a substantially continuous pressure decline throughout its duration.

The cycle can, optionally, be repeated at least one time. The fluid volumes and injection rates for the second and later cycles are the same as or smaller than the first cycle volumes and injection rates. The surfactant can be injected before the gas.

The present process is preferably practiced in a formation having an oil-bearing interval at least about 100 feet thick and layers of varying permeability to fluids. The permeability of the lower permeability layers should preferably be between about 10 md and about 1,000 md. For the purposes of this invention, the entire oil-bearing interval is treated as a single unit, with fluid injection over the entire interval.

The following example demonstrates the practice and utility of the present invention but is not to be construed as limiting the scope thereof.

EXAMPLE

As shown schematically in the figure, layers 1 and 3 of a reservoir are each 50 feet thick and have permeabilities greater than 500 md. Layer 2 is 100 feet thick and has a permeability less than 100 md. The fluid and gas compositions are shown in the ternary diagrams, and the residual oil saturations are shown for each layer and for the total reservoir. FIGS. 1a–1e show the results after successive steps in the process of this invention. FIG. 1a illustrates the reservoir after water flooding but prior to the process of this invention. FIG. 1b shows the results after injection of 20 percent effective pore volume of an aqueous solution of 1,000 ppm ethoxy alcohol, and FIG. 1c shows the results after a water flush. FIG. 1d indicates the saturations after produced gas injection, and FIG. 1e shows the results of a second water flush. Each of the water and gas flushes in the last three steps is continued until production declines below an acceptable level. The total oil saturation decreases with each successive step, from 67.5% to 53.8%.

Thus, the process of the present invention improves recovery of oil from heterogeneous formations. While the foregoing preferred embodiments of the invention have been described and shown, it is understood that the alternatives and modifications, such as those suggested and others, may be made thereto and fall within the scope of the invention.

I claim:

1. A process for enhanced recovery of hydrocarbons from a subterranean formation, penetrated by at least one injection well and at least one production well in fluid communication with the formation, the formation having heterogeneous permeability with an aqueous fluid present in the higher permeability layers and oil present in the lower permeability layers, the steps comprising:

injecting an aqueous surfactant solution into the formation via the at least one injection well, said surfactant solution having a surfactant dissolved therein in an amount effective to imbibe into and create an interface tension gradient within the lower permeability layers, the interface tension gradient causing displacement of a first quantity of oil from the lower permeability layers into the higher permeability layers;

injecting a first aqueous fluid into the formation via the at least one injection well, thereby sweeping at least a portion of the first quantity of oil from the higher permeability layers to the at least one production well;

injecting a gas into the formation via the at least one injection well, a portion of the gas entering the lower permeability layers by gravity segregation, thereby displacing a second quantity of oil from the lower permeability layers to the higher permeability layers;

injecting a second aqueous fluid into the formation via the at least one injection well thereby sweeping at least a portion of the second quantity of oil from the higher permeability layers to the at least one production well; and recovering the portions of the first and second quantities of oil from the at least one production well.

2. The process of claim 1 wherein said gas and said second aqueous fluid are injected prior to said surfactant and said first aqueous fluid.

3. The process of claim 1 wherein said second aqueous fluid is a quantity of water more than one effective pore volume.

4. The process of claim 1 wherein the reservoir is at least 100 feet thick.

5. The process of claim 1 wherein the lower permeability layers are lenticular in shape and enclosed in a higher-permeability matrix.

6. The process of claim 1 wherein the surfactant concentration is between about 250 ppm and about 10,000 ppm by weight.

7. The process of claim 1 wherein the surfactant concentration is between about 750 ppm and about 1500 ppm by weight.

8. The process of claim 1 wherein the surfactant is selected from the group comprised of ethoxylated alcohols, ethoxylated sulfates, ethoxylated phenols, and mixtures thereof.

9. The process of claim 1 wherein the quantity of gas injected is between about 0.01 pore volume and about 0.2 pore volume at reservoir temperature and pressure.

10. The process of claim 1 wherein the reservoir contains natural fractures, the fractures comprising the higher permeability layers and the reservoir rock between the fractures comprising the lower permeability layers.

11. The process of claim 1 wherein the process is repeated at least one time.

12. The process of claim 11 wherein the quantities of the surfactant solution and the gas during the second and later cycles are the same as during the first cycle.

13. The process of claim 11 wherein the quantity of the surfactant solution during the second and later cycles is less than during the first cycle.

14. The process of claim 11 wherein the quantity of the gas of step (b) during the second and later cycles is less than during the first cycle.

* * * * *